(12) United States Patent
Bell et al.

(10) Patent No.: US 9,973,508 B2
(45) Date of Patent: May 15, 2018

(54) DYNAMIC RECORD IDENTIFICATION AND ANALYSIS COMPUTER SYSTEM WITH EVENT MONITORING COMPONENTS

(71) Applicant: Bank of America Corporation, Charlotte, NC (US)

(72) Inventors: Kolt Bell, Charlotte, NC (US); John Tuders, Harrisburg, NC (US); Alvino Sarran, Nashville, TN (US); Michael Ayers-Morris, Wilmington, DE (US); Alex Stapleton, Charlotte, NC (US); Craig D. Widmann, Chandler, AZ (US); Paulette Price, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 15/041,802

(22) Filed: Feb. 11, 2016

(65) Prior Publication Data

US 2017/0237741 A1 Aug. 17, 2017

(51) Int. Cl.
*H04L 29/06* (2006.01)
*G06Q 20/40* (2012.01)

(52) U.S. Cl.
CPC .......... *H04L 63/101* (2013.01); *G06Q 20/40* (2013.01)

(58) Field of Classification Search
CPC ......... H04L 63/101; H04L 9/00; G06F 15/16; G06F 7/00; G06F 17/30; G06F 3/14; G09G 5/00; G05B 19/00; G06Q 40/00; G06Q 10/06; G06Q 20/00

USPC ........ 726/1–4; 707/749, 802, 767; 713/182; 705/35, 44, 76; 709/204, 206, 223; 340/5.81

See application file for complete search history.

(56) References Cited

U.S. PATENT DOCUMENTS

| | | | |
|---|---|---|---|
| 6,119,103 A | 9/2000 | Basch et al. | |
| 7,480,631 B1 | 1/2009 | Merced et al. | |
| 8,024,367 B2 * | 9/2011 | Heinzel ................ | G06Q 10/107 707/802 |
| 8,412,605 B2 | 4/2013 | Griffin et al. | |
| 8,504,456 B2 | 8/2013 | Griffin et al. | |
| 8,588,744 B2 * | 11/2013 | Vendrow ................ | G06Q 20/32 455/410 |

(Continued)

*Primary Examiner* — Thanhnga B Truong
(74) *Attorney, Agent, or Firm* — Banner & Witcoff, Ltd.; Michael A. Springs

(57) ABSTRACT

Aspects of the disclosure relate to deploying and utilizing a dynamic record identification and analysis computer system with event monitoring components. In some embodiments, a computing platform may receive, from a contact feed generation computer system, one or more contact feeds comprising contact data identifying one or more contacts associated with one or more user accounts. The computing platform may analyze the one or more contact feeds to identify a first subset of user accounts of the one or more user accounts having one or more attributes associated with one or more predetermined account security concern characteristics. Subsequently, the computing platform may add the first subset of user accounts of the one or more user accounts to an alert table maintained by the computing platform, and may send, to an analyst computer system, alert table listing information identifying contents of the alert table maintained by the computing platform.

18 Claims, 10 Drawing Sheets

(56) References Cited

U.S. PATENT DOCUMENTS 8,589,298 B2 11/2013 Choudhuri et al.
8,626,663 B2 1/2014 Nightengale et al.

\* cited by examiner

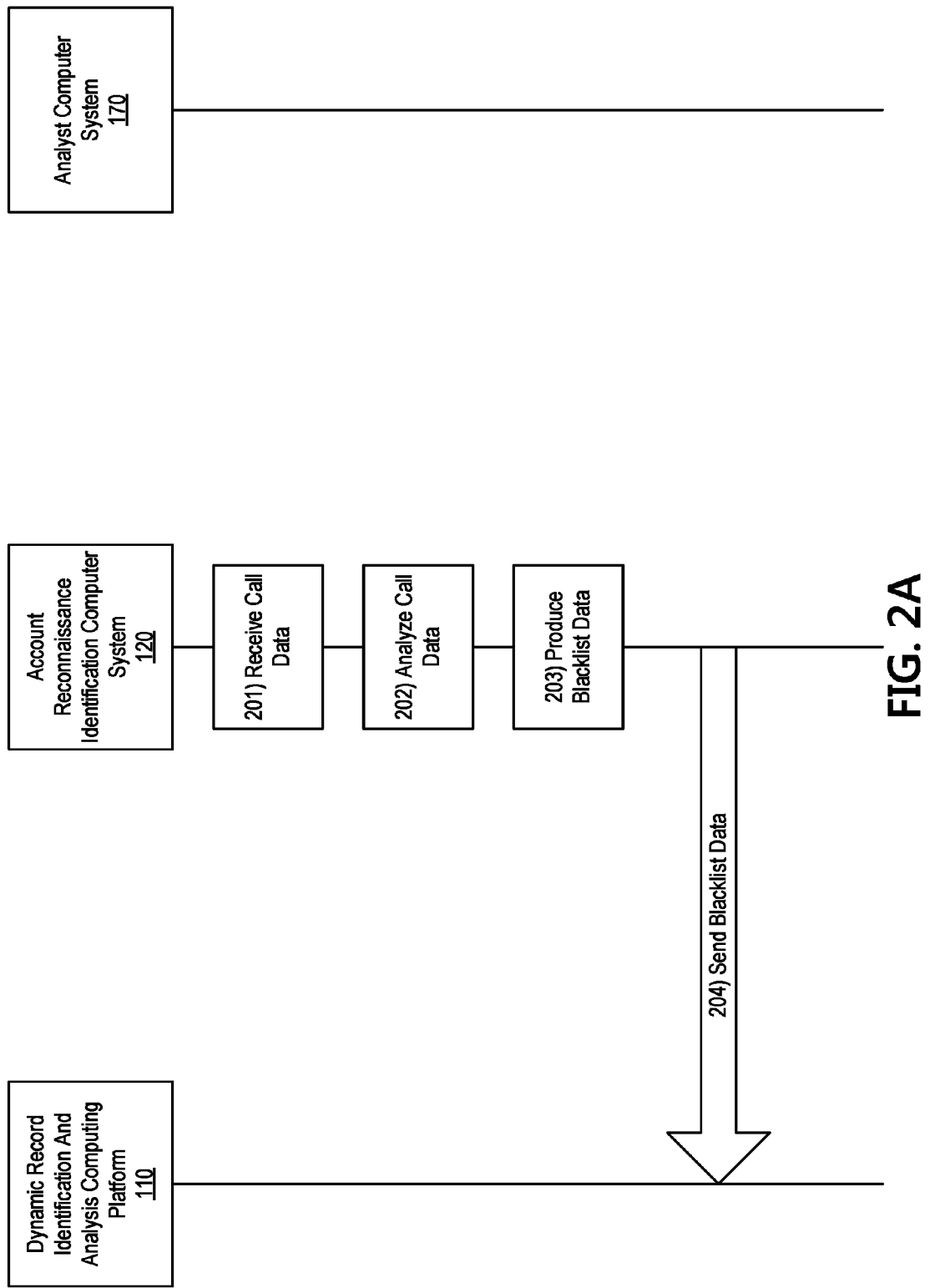

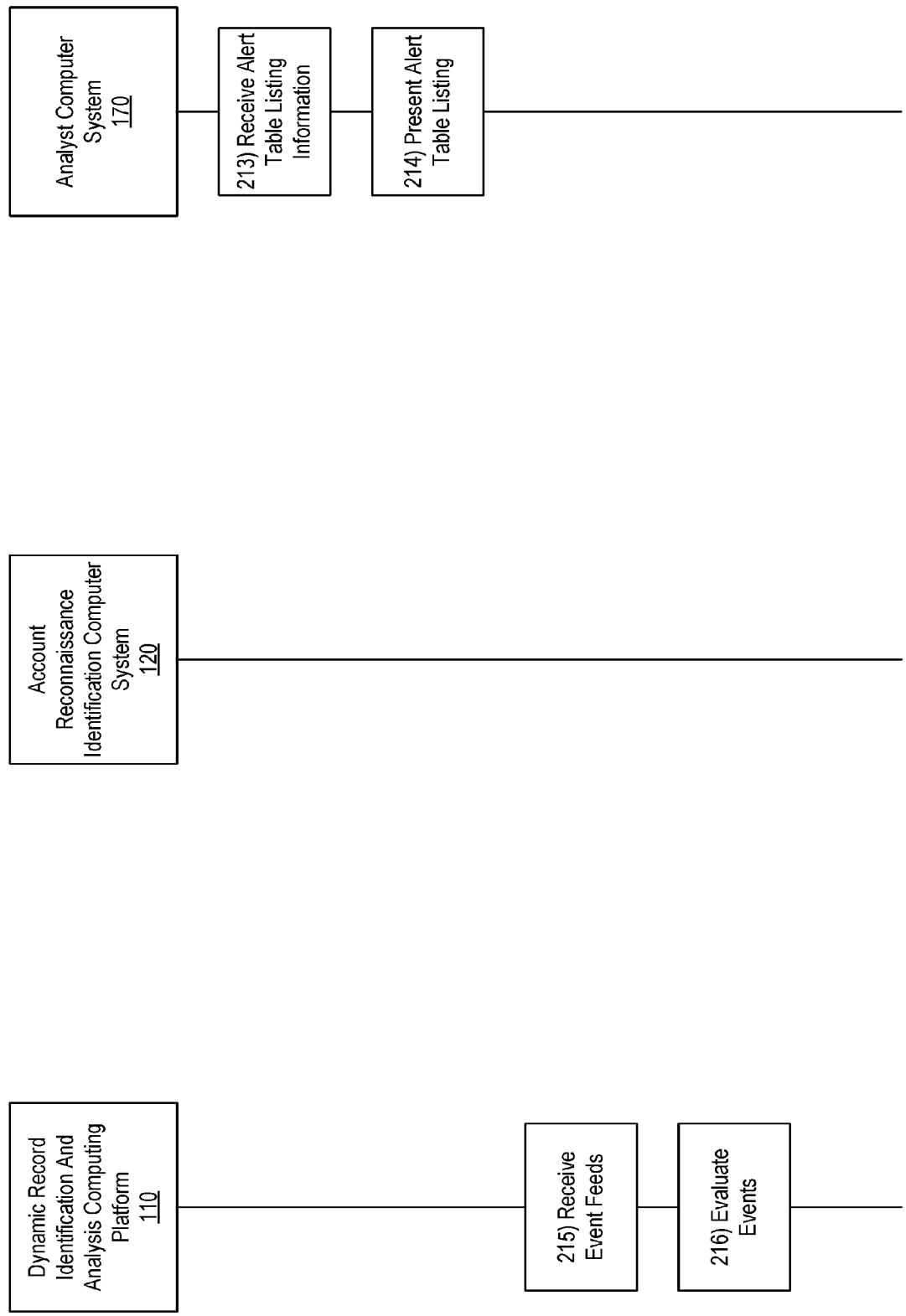

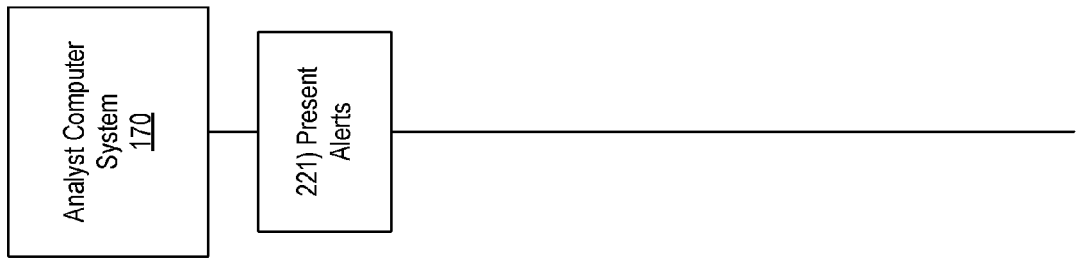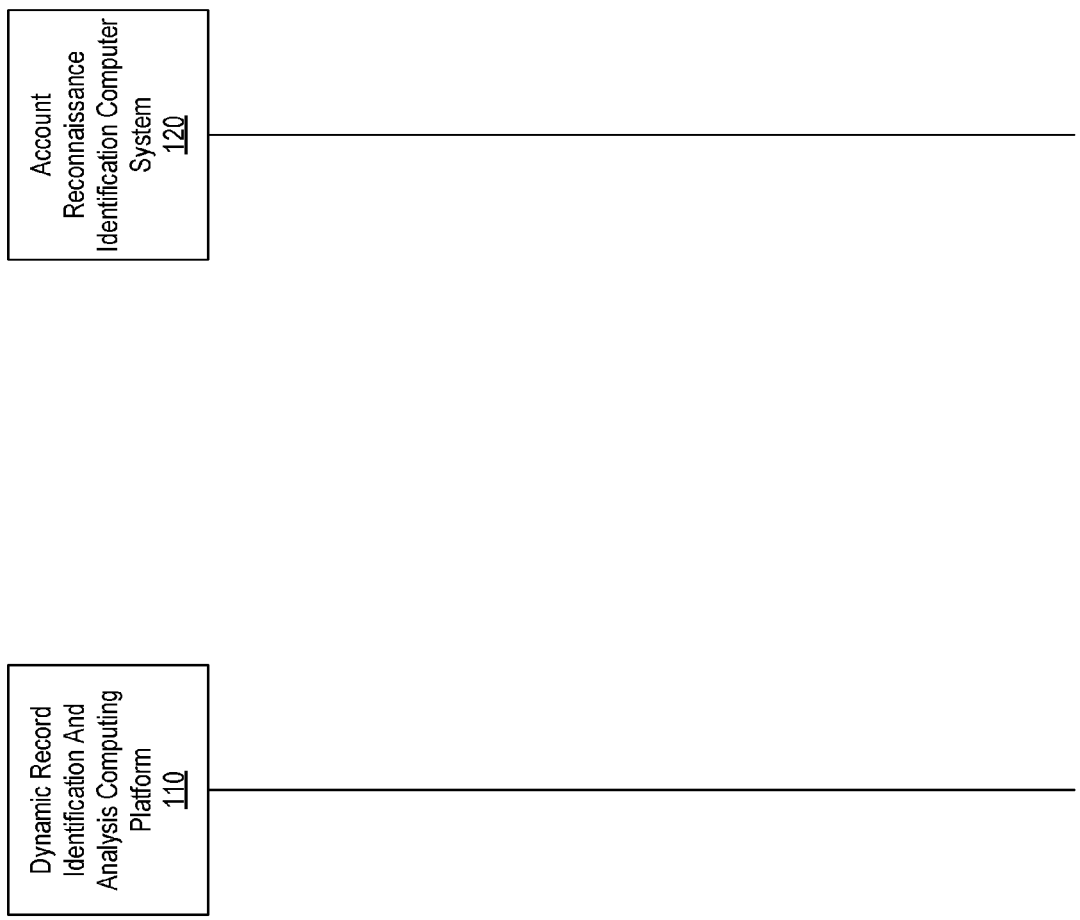

DYNAMIC RECORD IDENTIFICATION AND ANALYSIS COMPUTER SYSTEM WITH EVENT MONITORING COMPONENTS

CROSS-REFERENCE TO RELATED APPLICATIONS

This application is related to U.S. patent application Ser. No. 15/041,792, filed on Feb. 11, 2016, and entitled "SYSTEM FOR UTILIZING ONE OR MORE DATABASES TO IDENTIFY A POINT OF COMPROMISE," which is hereby incorporated by reference herein in its entirety.

BACKGROUND

Aspects of the disclosure relate to computer hardware and software. In particular, one or more aspects of the disclosure relate to deploying and utilizing a dynamic record identification and analysis computer system with event monitoring components.

Computers are playing increasingly important roles in the daily lives of many people. For example, businesses and consumers are increasingly relying on computer hardware and software for a variety of purposes. Some computer systems may be utilized by organizations and other entities to maintain client information and/or support client-facing operations. As these systems are used to maintain ever-growing amounts of client information, it may be increasingly important to ensure the safety and security of such information. In many instances, however, it may be difficult to ensure the safety and security of such information while also optimizing the efficient and effective technical operations of such systems.

SUMMARY

Aspects of the disclosure provide effective, efficient, scalable, and convenient technical solutions that address and overcome the technical problems associated with maintaining and ensuring the safety and security of client information.

In accordance with one or more embodiments, a dynamic record identification and analysis computing platform having at least one processor, a memory, and a communication interface may receive, via the communication interface, and from a contact feed generation computer system, one or more contact feeds comprising contact data identifying one or more contacts associated with one or more user accounts. Based on receiving the one or more contact feeds comprising the contact data identifying the one or more contacts associated with the one or more user accounts from the contact feed generation computer system, the dynamic record identification and analysis computing platform may analyze the one or more contact feeds to identify a first subset of user accounts of the one or more user accounts, the first subset of user accounts having one or more attributes associated with one or more predetermined account security concern characteristics. Based on identifying the first subset of user accounts of the one or more user accounts, the dynamic record identification and analysis computing platform may add the first subset of user accounts of the one or more user accounts to an alert table maintained by the computing platform. Based on adding the first subset of user accounts of the one or more user accounts to the alert table maintained by the computing platform, the dynamic record identification and analysis computing platform may send, via the communication interface, to an analyst computer system, alert table listing information identifying contents of the alert table maintained by the computing platform.

In some embodiments, based on adding the first subset of user accounts of the one or more user accounts to the alert table maintained by the computing platform, the dynamic record identification and analysis computing platform may update one or more flags in the alert table maintained by the computing platform, the one or more flags identifying one or more reasons for adding the first subset of user accounts of the one or more user accounts to the alert table maintained by the computing platform.

In some embodiments, based on adding the first subset of user accounts of the one or more user accounts to the alert table maintained by the computing platform, the dynamic record identification and analysis computing platform may calculate a temporally dynamic alert score for each user account of the first subset of user accounts added to the alert table.

In some embodiments, the dynamic record identification and analysis computing platform may receive, via the communication interface, one or more event feeds comprising event data identifying one or more events associated with the one or more user accounts. Based on receiving the one or more event feeds comprising the event data identifying the one or more events associated with the one or more user accounts, the dynamic record identification and analysis computing platform may evaluate the one or more events associated with the one or more user accounts based on one or more temporally dynamic alert scores corresponding to the one or more user accounts. Based on evaluating the one or more events associated with the one or more user accounts, the dynamic record identification and analysis computing platform may generate at least one alert for at least one user account, the at least one alert identifying at least one suspicious event associated with the at least one user account. Based on generating the at least one alert for the at least one user account, the dynamic record identification and analysis computing platform may perform one or more actions on the at least one user account, the one or more actions performed on the at least one user account being responsive to the at least one suspicious event associated with the at least one user account.

In some embodiments, based on generating the at least one alert for the at least one user account, send, via the communication interface, the dynamic record identification and analysis computing platform may send, via the communication interface, to the analyst computer system, event alert information identifying the at least one alert generated for the at least one user account.

In some embodiments, prior to receiving the one or more contact feeds comprising the contact data identifying the one or more contacts associated with the one or more user accounts from the contact feed generation computer system, the dynamic record identification and analysis computing platform may receive, via the communication interface, and from an account reconnaissance identification system, blacklist data identifying one or more suspicious telephone numbers associated with one or more account reconnaissance activities. Based on receiving the blacklist data identifying the one or more suspicious telephone numbers associated with the one or more account reconnaissance activities, the dynamic record identification and analysis computing platform may update one or more local blacklist tables to include the blacklist data identifying the one or more suspicious telephone numbers associated with the one or more account reconnaissance activities.

In some embodiments, the account reconnaissance identification system may be configured to monitor and analyze call data received from one or more interactive voice response (IVR) systems and one or more call center systems to identify the one or more suspicious telephone numbers associated with the one or more account reconnaissance activities.

In some embodiments, the contact data may include information indicating that a first user account associated with a first user was contacted by a first telephone number, and the contact data may include information indicating that a second user account associated with a second user was contacted by a second telephone number. In some instances, the second user account associated with the second user may be different from the first user account associated with the first user, and the second telephone number may be different from the first telephone number. In other instances, the second telephone number may be the same as the first telephone number (e.g., instead of being different from the first telephone number).

In some embodiments, the contact data may include information indicating that a first user account associated with a first user was contacted by a first mobile malware application. In some embodiments, the contact data may include information indicating that a first user account associated with a first user was contacted by a first suspicious network address. In some embodiments, the contact data may include information indicating that a first user account associated with a first user was contacted by a first suspicious cookie. In some embodiments, the contact data may include information indicating that a first user account associated with a first user was contacted by a first suspicious email address. In some embodiments, the contact data may include information indicating that a first user account associated with a first user was contacted by a first suspicious text chat session. In some embodiments, the first subset of user accounts may have at least one attribute indicative of previous unauthorized activity. In some embodiments, the first subset of user accounts may have at least one attribute indicative of at least one previous account takeover event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for deploying and utilizing a dynamic record identification and analysis computer system with event monitoring components in accordance with one or more example embodiments;

DETAILED DESCRIPTION

Figure 1A:
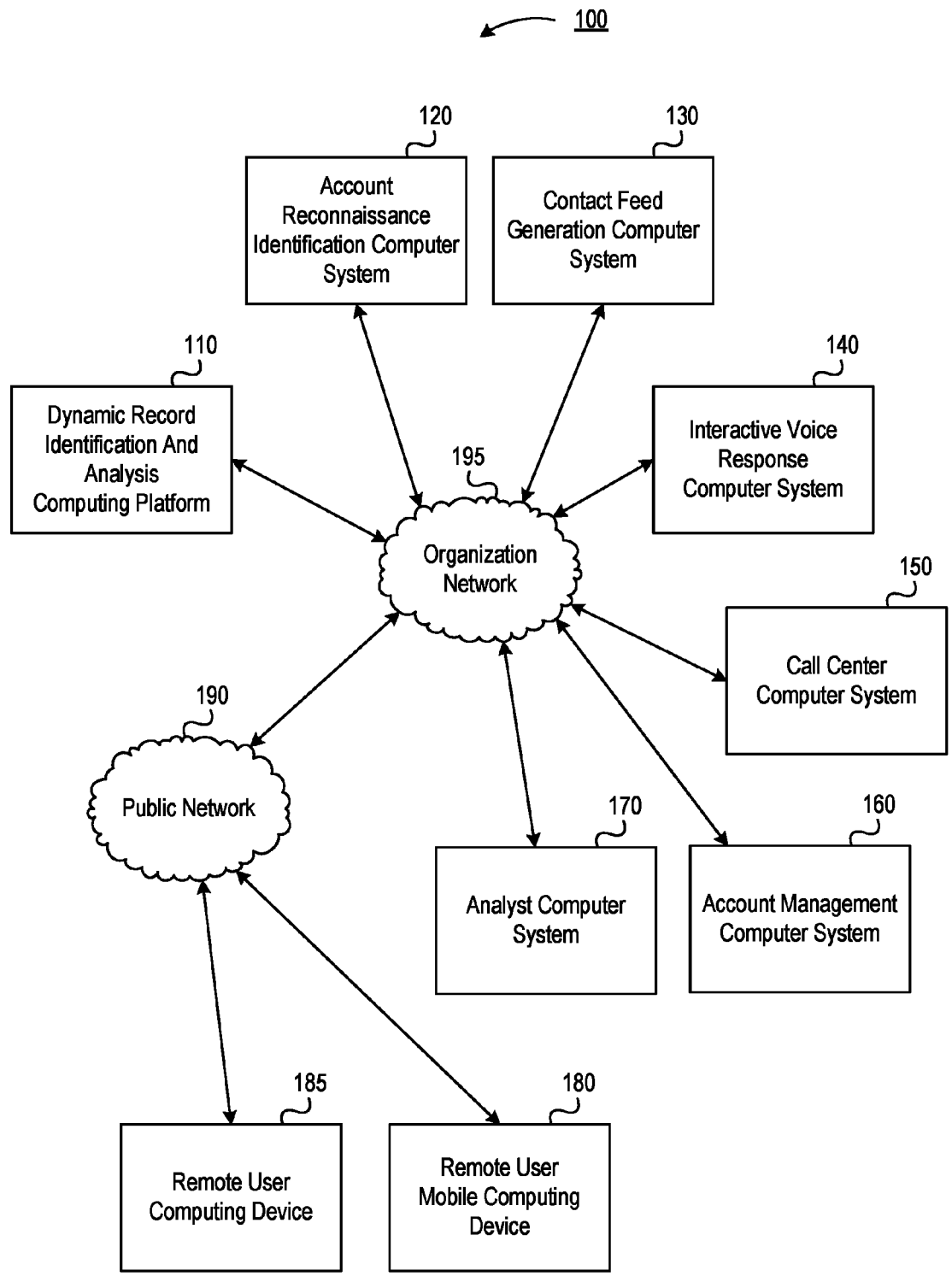
FIGS. 1A and 1B depict an illustrative computing environment for deploying and utilizing a dynamic record identification and analysis computer system with event monitoring components in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Account takeover (e.g., when an unauthorized person or entity gains control of another person or entity's one or more accounts, which may be financial accounts in some instances and/or other user accounts) is a growing problem for organizations, such as financial institutions. By implementing one or more aspects of the disclosure, an organization (e.g., a financial institution) may be able to identify unauthorized persons or entities who may be attempting to socially engineer and/or otherwise improperly obtain customer information, perform account reconnaissance, and/or conduct account takeover. In particular, one or more aspects of the disclosure may enable an organization to identify customers who may be victims of and/or at risk for account takeover and/or having their identity stolen. In some instances, such identification may be performed using a dynamic and predictive risk score, as discussed in greater detail below, which may be indicative of the likelihood that an event is the result of account takeover and/or a legitimate customer having their identity stolen by an unauthorized person.

By leveraging this score and/or one or more other aspects of the disclosure, an organization, such as a financial institution, may apply various strategies designed and implemented to detect and prevent unauthorized account activity, as well as differentiated treatment options specific to one or more particular customers based on the risk of account takeover and/or a legitimate customer having their identity stolen by an unauthorized person. In some instances, the accuracy of the risk score (which may, e.g., also be referred to as an "alert score" in some instances) may allow for a reduction in alert volume and in false positive rates to minimize expenses incurred by an organization implementing one or more aspects of the disclosure, while also reducing losses due to unauthorized activity.

As illustrated in greater detail below, a computer system implementing one or more aspects of the disclosure may implement and/or execute one or more algorithms that allow the system to identify individuals conducting account reconnaissance via various channels of an organization, including interactive voice response (IVR) channels and/or call center channels. In addition to identifying account reconnaissance activities, a computer system implementing one or more aspects of the disclosure also may take into account other high risk attributes that may be predictive and/or indicative of a legitimate customer having their identity stolen by an unauthorized person and may produce a customer-specific score to assist in monitoring one or more accounts of the customer, one or more user profiles of the customer, and/or the like. This dynamic score may, for instance, be used by a computer system implementing one or more aspects of the disclosure in implementing strategies for detecting and/or preventing unauthorized activity in the context of both non-monetary and/or monetary transactions, as such a score may be utilized by the computer system in producing alerts for review by analysts, declining transactions at a point of sale, and/or performing other appropriate actions. In some instances, the risk score may be dynamic, such that an individual customer's score may change over time to provide an ongoing assessment of the specific customer's risk of account takeover and/or of having their identity stolen by an unauthorized person (e.g., rather than simply having a one-time score that is calculated based simply on a change to the customer's account information, such as their phone number, email address, mailing address, or the like). In some instances, a computer system implementing one or more aspects of the disclosure may calculate a risk score for a customer even if there has not been a change to the customer's account information and/or profile information, as illustrated in greater detail below.

Figure 1B:
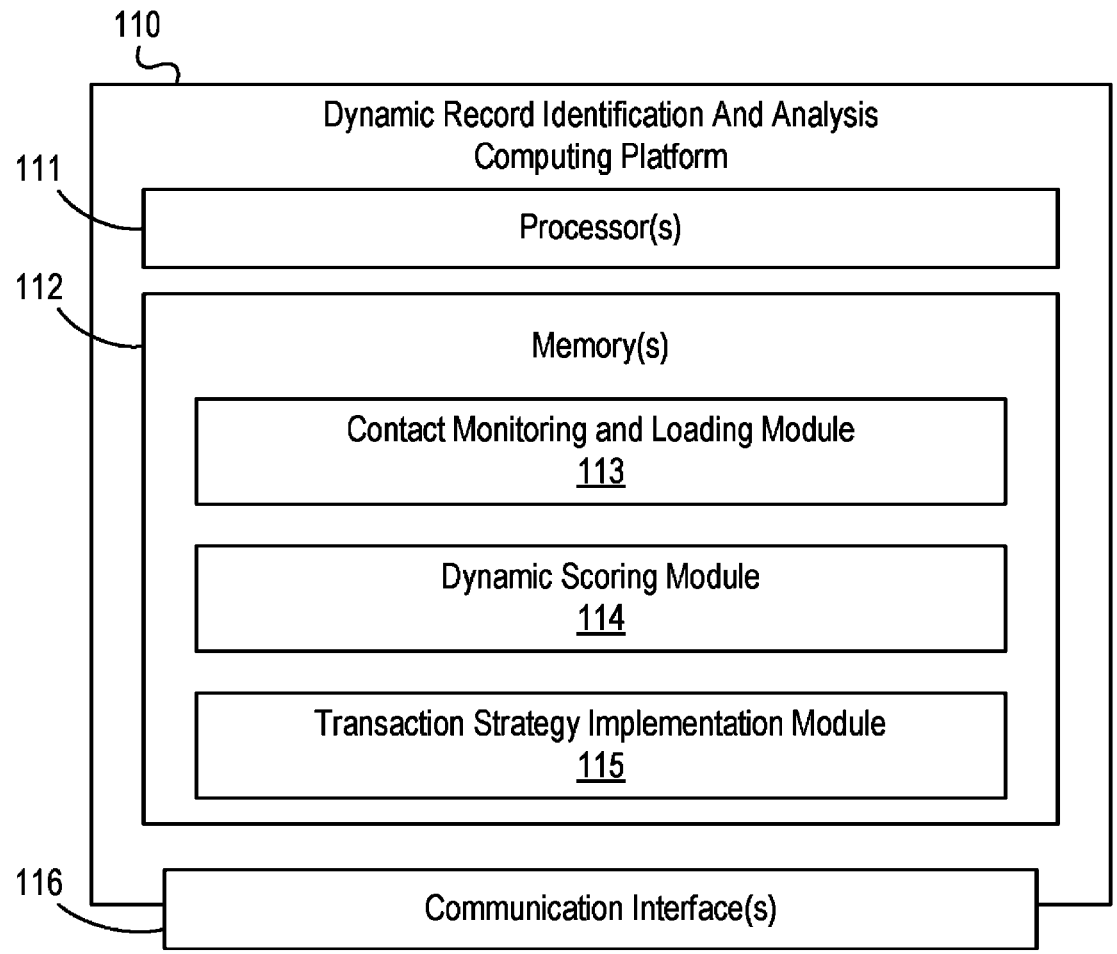

FIGS. 1A and 1B depict an illustrative computing environment for deploying and utilizing a dynamic record identification and analysis computer system with event monitoring components in accordance with one or more example embodiments. Referring to FIG. 1A, computing environment 100 may include one or more computing devices. For example, computing environment 100 may include an account reconnaissance computer system 120, a contact feed generation computer system 130, an interactive voice response computer system 140, a call center computer system 150, an account management computer system 160, an analyst computer system 170, a remote user mobile computing device 180, and a remote user computing device 185.

Account reconnaissance computer system 120 may be configured to receive and analyze call data to identify suspicious phone numbers (which may, e.g., be associated with one or more account reconnaissance activities) and/or produce blacklist data identifying such suspicious phone numbers based on such analysis. Contact feed generation computer system 130 may be configured to produce, generate, and/or share one or more contact feeds that include information identifying one or more specific contact events with one or more specific user accounts. Such a contact feed may, for instance, include event information indicating that a specific user account was accessed, touched, and/or otherwise contacted by a person or other entity utilizing a blacklisted phone number, blacklisted mobile malware, a blacklisted network address or cookie, a blacklisted email address, and/or the like. Interactive voice response computer system 140 may include and/or interface with one or more interactive voice response (IVR) systems of an organization, such as a financial institution, which may provide automated telephone assistance to various users, including one or more customers of the organization. Call center computer system 150 may include and/or interface with one or more computer systems deployed in one or more call centers of an organization, such as a financial institution. Such computer systems may be configured to be used by one or more customer service representatives of the organization and may support call center operations of the organization, for instance, by allowing such customer service representatives to access, view, and/or modify user information and/or account information, such as financial account information.

Account management computer system 160 may be configured to store and/or maintain account information for one or more customers of an organization. For instance, account management computer system 160 may be configured to store and/or maintain account information for one or more customers of a financial institution. Analyst computer system 170 may include and/or interface with one or more computer systems used by one or more analysts of an organization, such as a financial institution. For instance, analyst computer system 170 may be configured to provide one or more interfaces that allow one or more analysts of an organization to access, view, and/or modify account information and/or other information, such as information associated with suspicious account activity, alert information, account takeover information, and/or the like.

Remote user mobile computing device 180 may be a mobile computing device (e.g., a smart phone, a tablet computer, a smart watch, a wearable device, or other mobile device) that is configured to be used by a remote user of an organization, such as a customer of a financial institution. Remote user computing device 185 may be a traditional computing device (e.g., a desktop computer, a laptop computer, or the like) that is configured to be used by a remote user of an organization, such as a customer of a financial institution.

In one or more arrangements, account reconnaissance computer system 120, contact feed generation computer system 130, interactive voice response computer system 140, call center computer system 150, account management computer system 160, analyst computer system 170, remote user mobile computing device 180, and remote user computing device 185 may be any type of computing device capable of receiving a user interface, receiving input via the user interface, and communicating the received input to one or more other computing devices. For example, account reconnaissance computer system 120, contact feed generation computer system 130, interactive voice response computer system 140, call center computer system 150, account management computer system 160, analyst computer system 170, remote user mobile computing device 180, and remote user computing device 185 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of account reconnaissance computer system 120, contact feed generation computer system 130, interactive voice response computer system 140, call center computer system 150, account management computer system 160, analyst computer system 170, remote user mobile computing device 180, and remote user computing device 185 may, in some instances, be special-purpose computing devices configured to perform specific functions.

Computing environment 100 also may include one or more computing platforms. For example, computing environment 100 may include dynamic record identification and analysis computing platform 110. As illustrated in greater detail below, dynamic record identification and analysis computing platform 110 may include one or more computing devices configured to perform one or more of the functions described herein. For example, dynamic record identification and analysis computing platform 110 may include one or more computers (e.g., laptop computers, desktop computers, servers, server blades, or the like).

Computing environment 100 also may include one or more networks, which may interconnect one or more of dynamic record identification and analysis computing platform 110, account reconnaissance computer system 120, contact feed generation computer system 130, interactive voice response computer system 140, call center computer system 150, account management computer system 160, analyst computer system 170, remote user mobile computing device 180, and remote user computing device 185. For example, computing environment 100 may include organization network 195 and public network 190. Organization network 195 and/or public network 190 may include one or more sub-networks (e.g., local area networks (LANs), wide area networks (WANs), or the like). Organization network 195 may be associated with a particular organization (e.g., a corporation, financial institution, educational institution, governmental institution, or the like) and may interconnect one or more computing devices associated with the organization. For example, dynamic record identification and analysis computing platform 110, account reconnaissance computer system 120, contact feed generation computer system 130, interactive voice response computer system 140, call center computer system 150, account management computer system 160, and analyst computer system 170 may be associated with an organization (e.g., a financial institution), and organization network 195 may be associated with and/or operated by the organization, and may include one or more networks (e.g., LANs, WANs, virtual private networks (VPNs), or the like) that interconnect dynamic record identification and analysis computing platform 110, account reconnaissance computer system 120, contact feed generation computer system 130, interactive voice response computer system 140, call center computer system 150, account management computer system 160, and analyst computer system 170 and one or more other computing devices and/or computer systems that are used by, operated by, and/or otherwise associated with the organization. Public network 190 may connect organization network 195 and/or one or more computing devices connected thereto (e.g., dynamic record identification and analysis computing platform 110, account reconnaissance computer system 120, contact feed generation computer system 130, interactive voice response computer system 140, call center computer system 150, account management computer system 160, and analyst computer system 170) with one or more networks and/or computing devices that are not associated with the organization. For example, remote user mobile computing device 180 and remote user computing device 185 might not be associated with an organization that operates organization network 195 (e.g., because remote user mobile computing device 180 and remote user computing device 185 may be owned and/or operated by one or more entities different from the organization that operates organization network 195, such as one or more customers of the organization and/or vendors of the organization, rather than being owned and/or operated by the organization itself or an employee or affiliate of the organization), and public network 190 may include one or more networks (e.g., the internet) that connect remote user mobile computing device 180 and remote user computing device 185 to organization network 195 and/or one or more computing devices connected thereto (e.g., dynamic record identification and analysis computing platform 110, account reconnaissance computer system 120, contact feed generation computer system 130, interactive voice response computer system 140, call center computer system 150, account management computer system 160, and analyst computer system 170).

Referring to FIG. 1B, dynamic record identification and analysis computing platform 110 may include one or more processors 111, memory 112, and communication interface 116. A data bus may interconnect processor(s) 111, memory 112, and communication interface 116. Communication interface 116 may be a network interface configured to support communication between dynamic record identification and analysis computing platform 110 and one or more networks (e.g., organization network 195, public network 190, or the like). Memory 112 may include one or more program modules having instructions that when executed by processor(s) 111 cause dynamic record identification and analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic record identification and analysis computing platform 110 and/or by different computing devices that may form and/or otherwise make up dynamic record identification and analysis computing platform 110. For example, memory 112 may include a contact monitoring and loading module 113, a dynamic scoring module 114, and a transaction strategy implementation module 115. Contact monitoring and loading module 113 may provide and/or perform one or more functions that enable and/or cause dynamic record identification and analysis computing platform 110 to monitor one or more contacts and/or other events (e.g., privacy events, failed authentication events, and/or other events) that involve and/or are otherwise associated with one or more user accounts, including one or more user accounts that are used by and/or are otherwise associated with one or more customers. Additionally or alternatively, contact monitoring and loading module 113 may provide and/or perform one or more functions that enable and/or cause dynamic record identification and analysis computing platform 110 to load one or more user accounts, including one or more user accounts that are used by and/or are otherwise associated with one or more customers, into one or more alert tables, as discussed in greater detail below. Dynamic scoring module 114 may provide and/or perform one or more functions that enable and/or cause dynamic record identification and analysis computing platform 110 to calculate one or more alert scores for one or more user accounts on an on-demand basis and/or on a periodic and/or predetermined basis (e.g., hourly, daily, weekly, and/or the like). Transaction strategy implementation module 115 may provide and/or perform one or more functions that enable and/or cause dynamic record identification and analysis computing platform 110 to perform one or more actions on and/or with respect to one or more user accounts, for instance, based on a risk score associated with a particular user account, based on an event that has occurred involving a particular user account, and/or the like.

Figure 2B:
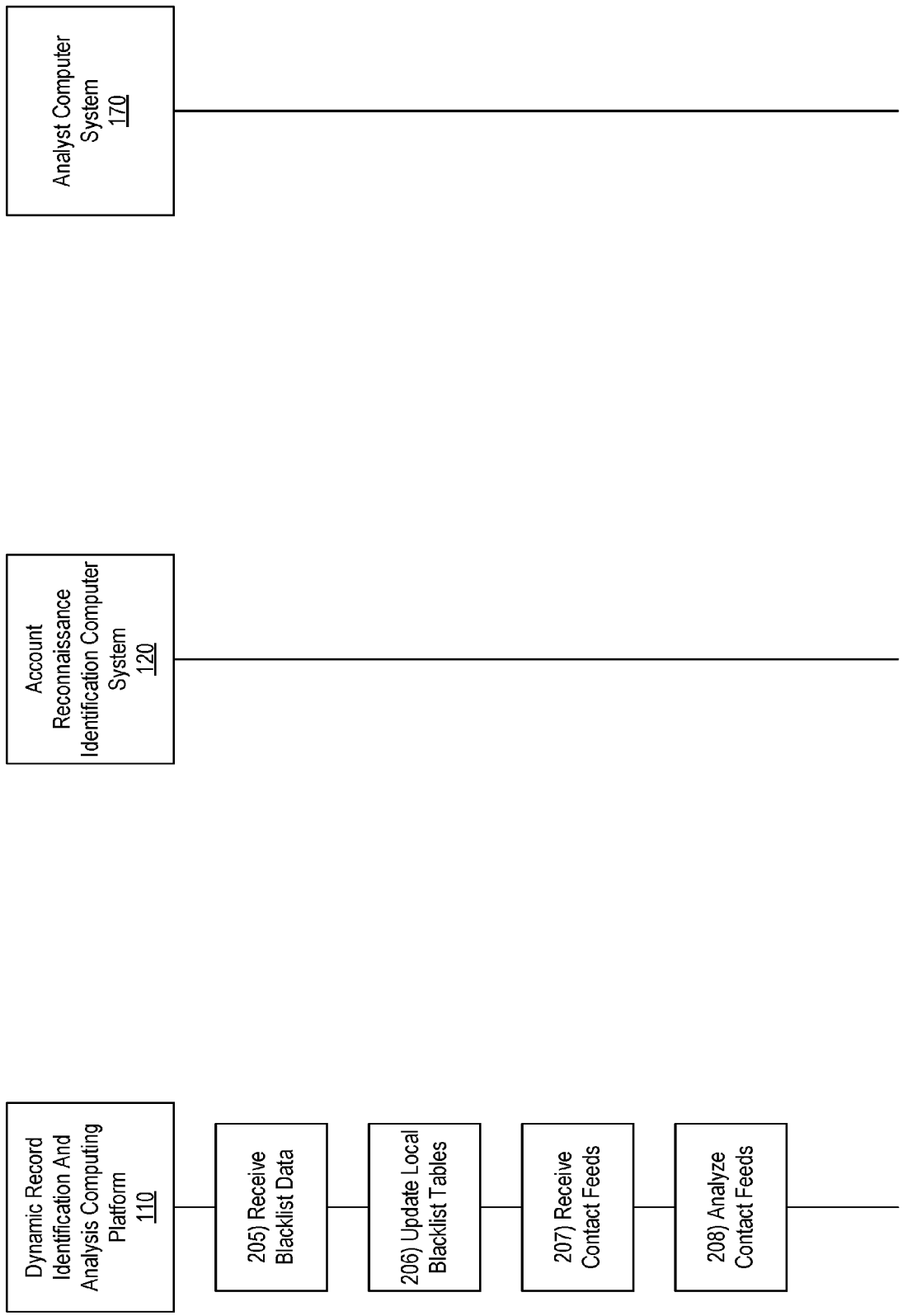

FIGS. 2A-2F depict an illustrative event sequence for deploying and utilizing a dynamic record identification and analysis computer system with event monitoring components in accordance with one or more example embodiments. Referring to FIG. 2A, at step 201, account reconnaissance computer system 120 may receive call data. For example, at step 201, account reconnaissance computer system 120 may receive call data from interactive voice response computer system 140, call center computer system 150, and/or one or more other telephone systems and/or computer systems. Such call data may, for instance, identify one or more telephone calls that were received by interactive voice response computer system 140, call center computer system 150, and/or the one or more other telephone systems and/or computer systems, and may include information indicating, for each call, the telephone number from which the call was received (which may, e.g., also be referred to as the automatic number identification (ANI) of the call), the time the call was received, an audio recording and/or transcript of the call, and/or other information associated with the call.

At step 202, account reconnaissance computer system 120 may analyze the call data. For example, at step 202, account reconnaissance computer system 120 may analyze the call data received at step 201 to identify one or more suspicious phone numbers which may be included in the call data, for instance, based on such phone numbers being involved in suspicious activities indicative of a person or entity using a particular phone number to conduct account reconnaissance. For instance, at step 202, account reconnaissance computer system 120 may determine that a particular phone number is and/or can be identified as a suspicious phone number based on the phone number being used and/or otherwise involved in suspicious activities indicative of a person or entity using a particular phone number to conduct account reconnaissance via an IVR channel, via a call center channel, and/or the like. At step 203, account reconnaissance computer system 120 may produce blacklist data. For example, at step 203, account reconnaissance computer system 120 may produce blacklist data identifying the one or more suspicious phone numbers identified by account reconnaissance computer system 120 in analyzing the call data at step 202. At step 204, account reconnaissance computer system 120 may send the blacklist data to dynamic record identification and analysis computing platform 110.

Referring to FIG. 2B, at step 205, dynamic record identification and analysis computing platform 110 may receive the blacklist data from account reconnaissance computer system 120. For example, at step 205, dynamic record identification and analysis computing platform 110 may receive, via the communication interface (e.g., communication interface 116), and from an account reconnaissance identification system (e.g., account reconnaissance computer system 120), blacklist data identifying one or more suspicious telephone numbers associated with one or more account reconnaissance activities. At step 206, dynamic record identification and analysis computing platform 110 may update one or more local blacklist tables. For example, at step 206, based on receiving the blacklist data identifying the one or more suspicious telephone numbers associated with the one or more account reconnaissance activities, dynamic record identification and analysis computing platform 110 may update one or more local blacklist tables to include the blacklist data identifying the one or more suspicious telephone numbers associated with the one or more account reconnaissance activities. For instance, dynamic record identification and analysis computing platform 110 may update one or more local blacklist tables based on the blacklist data received from account reconnaissance computer system 120. In updating the one or more local blacklist tables based on the blacklist data received from account reconnaissance computer system 120, dynamic record identification and analysis computing platform 110 may, for instance, add one or more newly identified telephone numbers to one or more blacklists that are locally maintained by and/or on dynamic record identification and analysis computing platform 110.

In some embodiments, the account reconnaissance identification system may be configured to monitor and analyze call data received from one or more interactive voice response (IVR) systems and one or more call center systems to identify the one or more suspicious telephone numbers associated with the one or more account reconnaissance activities. For example, the account reconnaissance identification system (e.g., account reconnaissance computer system 120) may be configured to monitor and analyze call data received from one or more interactive voice response (IVR) systems (e.g., interactive voice response computer system 140) and one or more call center systems (e.g., call center computer system 150) to identify the one or more suspicious telephone numbers associated with the one or more account reconnaissance activities.

At step 207, dynamic record identification and analysis computing platform 110 may receive one or more contact feeds (e.g., from one or more other computer systems and/or from one or more internal monitoring components). For example, at step 207, dynamic record identification and analysis computing platform 110 may receive, via the communication interface (e.g., communication interface 116), and from a contact feed generation computer system (e.g., contact feed generation computer system 130), one or more contact feeds comprising contact data identifying one or more contacts associated with one or more user accounts. Such contact data may, for instance, indicate that one or more specific user accounts were accessed via and/or otherwise contacted by one or more specific contact sources, such as one or more specific persons and/or entities, one or more specific telephone numbers, one or more specific network addresses, and/or one or more specific other sources, as discussed in greater detail below.

At step 208, dynamic record identification and analysis computing platform 110 may analyze the one or more contact feeds. For example, at step 208, based on receiving the one or more contact feeds comprising the contact data identifying the one or more contacts associated with the one or more user accounts from the contact feed generation computer system (e.g., contact feed generation computer system 130), dynamic record identification and analysis computing platform 110 may analyze the one or more contact feeds to identify a first subset of user accounts of the one or more user accounts, the first subset of user accounts having one or more attributes associated with one or more predetermined account security concern characteristics. For instance, in analyzing the one or more contact feeds to identify a first subset of user accounts having one or more attributes associated with one or more predetermined account security concern characteristics, dynamic record identification and analysis computing platform 110 may identify one or more specific customers with one or more high risk attributes that are predictive of account takeover and/or other unauthorized activity. Such attributes may, for instance, include whether a particular customer is a previous account takeover victim and/or a privacy event victim, has one or more interactions involving failed authentication, has been contacted by one or more blacklisted phone numbers, has been contacted by blacklisted mobile malware, has been contacted by one or more blacklisted network addresses and/or cookies, has been contacted by one or more blacklisted email addresses, has been contacted by one or more blacklisted text chat addresses, has one or more outstanding alerts for unauthorized activity, and/or other attributes.

In some embodiments, the contact data may include information indicating that a first user account associated with a first user was contacted by a first telephone number, and the contact data also may include information indicating that a second user account associated with a second user was contacted by a second telephone number. The second user account associated with the second user may be different from the first user account associated with the first user, and the second telephone number may be different from the first telephone number. For example, the contact data (which may, e.g., be received by dynamic record identification and analysis computing platform 110 at step 207 and/or analyzed by dynamic record identification and analysis computing platform 110 at step 208) may indicate that specific phone numbers were used to access specific customer accounts, and this contact data may be analyzed to identify suspicious contacts with such customer accounts. The customer accounts may, for instance, be maintained by an organization, such as a financial institution, for specific customers of the organization. In some additional and/or alternative embodiments, the second telephone number may be the same as the first telephone number (e.g., instead of being different from the first telephone number). In these instances, the contact data may thus include information indicating that both the first user account associated with the first user and the second user account associated with the second user were contacted by the same telephone number.

In some embodiments, the contact data may include information indicating that a first user account associated with a first user was contacted by a first suspicious telephone number. For example, the contact data (which may, e.g., be received by dynamic record identification and analysis computing platform 110 at step 207 and/or analyzed by dynamic record identification and analysis computing platform 110 at step 208) may include information indicating that a specific user account associated with a specific user was contacted by a specific suspicious telephone number, such as a telephone number included on one or more blacklists maintained by dynamic record identification and analysis computing platform 110.

In some embodiments, the contact data may include information indicating that a first user account associated with a first user was contacted by a first mobile malware application. For example, the contact data (which may, e.g., be received by dynamic record identification and analysis computing platform 110 at step 207 and/or analyzed by dynamic record identification and analysis computing platform 110 at step 208) may include information indicating that a particular user account associated with a particular user was contacted by a specific mobile malware application and/or a specific type of mobile malware application, such as adware, spyware, and/or the like.

In some embodiments, the contact data may include information indicating that a first user account associated with a first user was contacted by a first suspicious network address. For example, the contact data (which may, e.g., be received by dynamic record identification and analysis computing platform 110 at step 207 and/or analyzed by dynamic record identification and analysis computing platform 110 at step 208) may include information indicating that a specific user account associated with a specific user was contacted by a specific suspicious network address, such as a specific IP address that has been identified as being and/or otherwise deemed to be suspicious by an organization operating dynamic record identification and analysis computing platform 110.

In some embodiments, the contact data may include information indicating that a first user account associated with a first user was contacted by a first suspicious cookie. For example, the contact data (which may, e.g., be received by dynamic record identification and analysis computing platform 110 at step 207 and/or analyzed by dynamic record identification and analysis computing platform 110 at step 208) may include information indicating that a specific user account associated with a specific user was contacted by a specific suspicious cookie. Such a cookie may, for instance, have been identified and/or deemed suspicious by an organization operating dynamic record identification and analysis computing platform 110 based on how it was presented to one or more web servers used by and/or operated by the organization operating dynamic record identification and analysis computing platform 110. For instance, such a cookie may be recognized as belonging to and/or otherwise corresponding to a computing device that known to belong to a malicious user.

In some embodiments, the contact data may include information indicating that a first user account associated with a first user was contacted by a first suspicious email address. For example, the contact data (which may, e.g., be received by dynamic record identification and analysis computing platform 110 at step 207 and/or analyzed by dynamic record identification and analysis computing platform 110 at step 208) may include information indicating that a specific user account associated with a specific user was contacted by a specific suspicious email address.

In some embodiments, the contact data may include information indicating that a first user account associated with a first user was contacted by a first suspicious text chat session. For example, the contact data (which may, e.g., be received by dynamic record identification and analysis computing platform 110 at step 207 and/or analyzed by dynamic record identification and analysis computing platform 110 at step 208) may include information indicating that a specific user account associated with a specific user was contacted during and/or via a specific suspicious text chat session.

In some embodiments, the first subset of user accounts may have at least one attribute indicative of previous unauthorized activity. For example, the first subset of user accounts (which may, e.g., be identified by dynamic record identification and analysis computing platform 110 as having one or more attributes associated with one or more predetermined account security concern characteristics) may have at least one attribute indicative of previous unauthorized activity. For instance, dynamic record identification and analysis computing platform 110 may identity one or more user accounts to be added to an alert table based on such user accounts being subject to previous unauthorized activity and/or based on such user accounts having one or more current and/or previous unauthorized activity alerts.

In some embodiments, the first subset of user accounts may have at least one attribute indicative of at least one previous account takeover event. For example, the first subset of user accounts (which may, e.g., be identified by dynamic record identification and analysis computing platform 110 as having one or more attributes associated with one or more predetermined account security concern characteristics) may have at least one attribute indicative of at least one previous account takeover event. For instance, dynamic record identification and analysis computing platform 110 may identity one or more user accounts to be added to an alert table based on such user accounts being subject to one or more previous account takeover events.

Figure 2C:
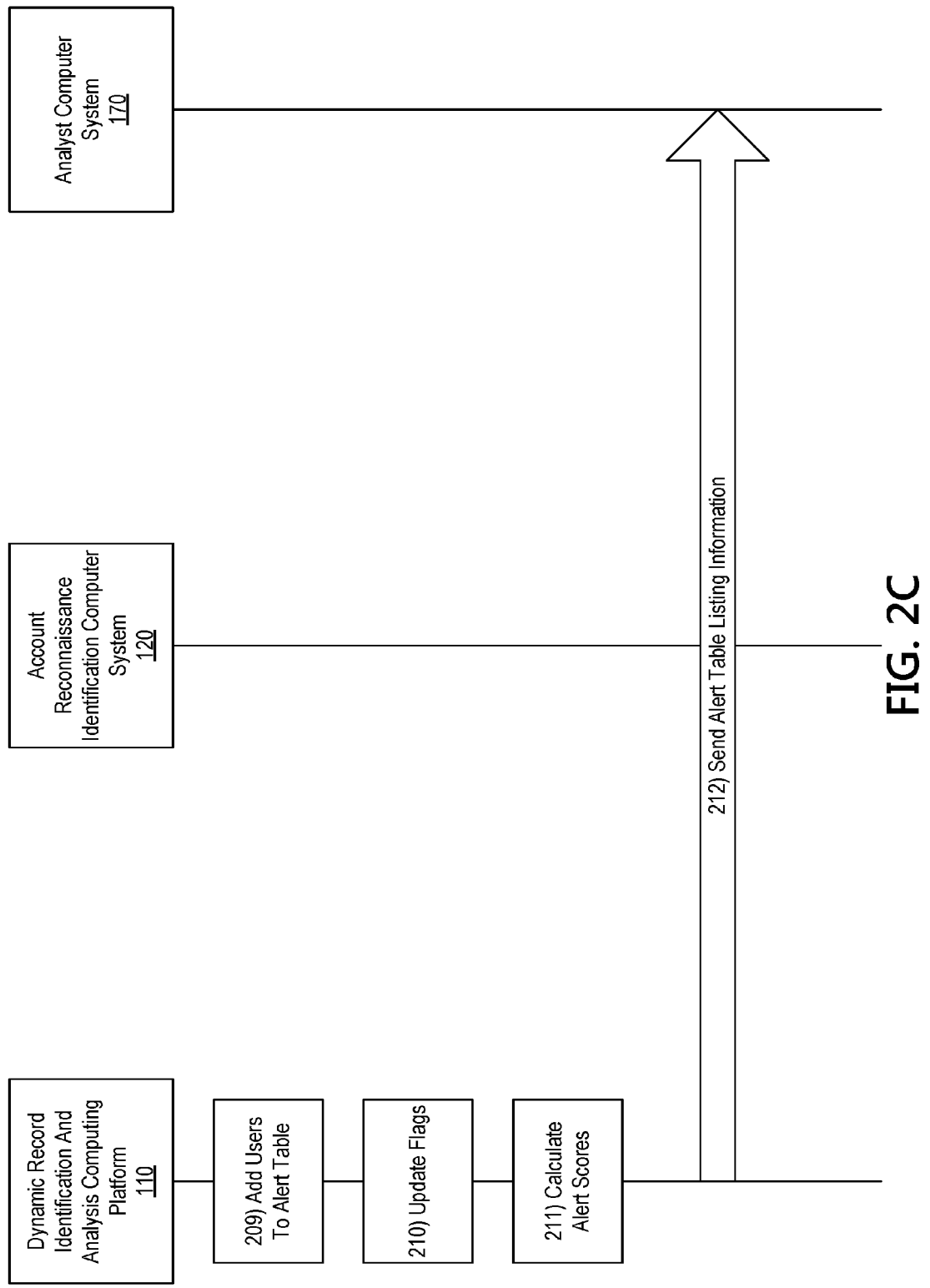

Referring to FIG. 2C, at step 209, dynamic record identification and analysis computing platform 110 may add one or more users to an alert table. For example, at step 209, based on identifying the first subset of user accounts of the one or more user accounts, dynamic record identification and analysis computing platform 110 may add the first subset of user accounts of the one or more user accounts to an alert table maintained by the computing platform (e.g., dynamic record identification and analysis computing platform 110). For instance, dynamic record identification and analysis computing platform 110 may add the customers identified at step 208 to an alert table maintained by dynamic record identification and analysis computing platform 110 at step 209.

At step 210, dynamic record identification and analysis computing platform 110 may update one or more flags. For example, at step 210, based on adding the first subset of user accounts of the one or more user accounts to the alert table, dynamic record identification and analysis computing platform 110 may update one or more flags in the alert table, and the one or more flags may identify one or more reasons for adding the first subset of user accounts of the one or more user accounts to the alert table. For instance, dynamic record identification and analysis computing platform 110 may, at step 210, update one or more flags in the alert table for the customers identified at step 208. Such flags may, for instance, indicate why each specific customer was added to the alert table, such as because they were contacted by a blacklisted phone number or a blacklisted network address, involved in a privacy event, involved in an account takeover, and/or the like.

At step 211, dynamic record identification and analysis computing platform 110 may calculate one or more alert scores. For example, at step 211, based on adding the first subset of user accounts of the one or more user accounts to the alert table, dynamic record identification and analysis computing platform 110 may calculate a temporally dynamic alert score for each user account of the first subset of user accounts added to the alert table. In some instances, the temporally dynamic alert score for a particular user account may increase with each suspicious contact instance and/or event. Additionally or alternatively, the temporally dynamic alert score for a particular user account may decrease gradually as time elapses without the particular user account experiencing a suspicious contact instance and/or event. Thus, at step 211, dynamic record identification and analysis computing platform 110 may calculate such a temporally dynamic alert score (which may, e.g., also be referred to as a "daily alert score") for each customer and/or user account included in the alert table.

In some instances, in calculating a temporally dynamic alert score for a particular user account, dynamic record identification and analysis computing platform 110 may use the following example formula to determine the alert score: [Alert Score]=[Number of Contacts]×[Type of Contact Factor]−[Number of Days Since Last Suspicious Contact or Event]. The [Type of Contact Factor] term in this equation may be a scaling factor that is used to weigh different types of contacts and/or events differently. For example, a type-of-contact factor of 25 may be used for a contact corresponding to a privacy event, such as an internal data leak or other internal event. Additionally or alternatively, a type-of-contact factor of 75 may be used for a contact corresponding to a failed authentication event, such as when a person or entity attempts to access a particular user account via a particular and fails an initial authentication prompt (e.g., via an IVR channel, via a call center channel, via an online banking channel, and/or via any other channel). Additionally or alternatively, a type-of-contact factor of 150 may be used for a contact corresponding to an account access attempt or an account access occurrence by a known malicious user. In addition to calculating a temporally dynamic alert score for each user account of the first subset of user accounts added to the alert table, dynamic record identification and analysis computing platform 110 also may calculate a temporally dynamic alert score for each user account that may already be included in the alert table (e.g., prior to the first subset of user accounts being added).

At step 212, dynamic record identification and analysis computing platform 110 may send alert table listing information to analyst computer system 170. For example, at step 212, based on adding the first subset of user accounts of the one or more user accounts to the alert table maintained by the computing platform (e.g., dynamic record identification and analysis computing platform 110), dynamic record identification and analysis computing platform 110 may send, via the communication interface (e.g., communication interface 116), to an analyst computer system (e.g., analyst computer system 170), alert table listing information identifying contents of the alert table maintained by the computing platform (e.g., dynamic record identification and analysis computing platform 110).

Figure 3:
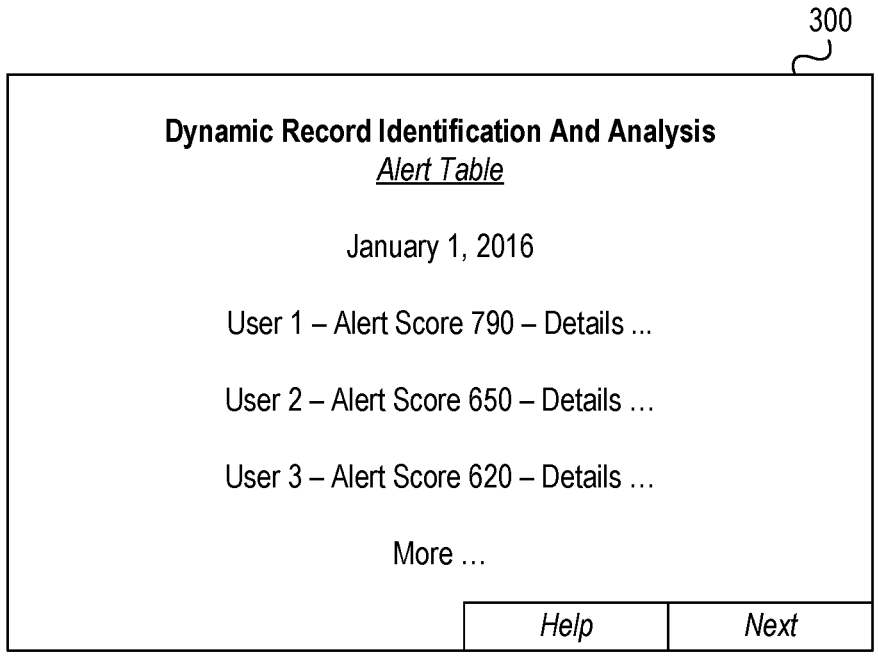
FIGS. 3 and 4 depict example graphical user interfaces for deploying and utilizing a dynamic record identification and analysis computer system with event monitoring components in accordance with one or more example embodiments.

Referring to FIG. 2D, at step 213, analyst computer system 170 may receive the alert table listing information from dynamic record identification and analysis computing platform 110. At step 214, analyst computer system 170 may present an alert table listing (e.g., based on the alert table listing information received from dynamic record identification and analysis computing platform 110). In presenting the alert table listing, analyst computer system 170 may display and/or otherwise present a graphical user interface similar to graphical user interface 300, which is illustrated in FIG. 3. As seen in FIG. 3, graphical user interface 300 may include information listing the current daily alert scores of one or more specific user accounts (which may, e.g., have been added to an alert table for heightened scrutiny and/or additional monitoring by dynamic record identification and analysis computing platform 110). As noted above, such alert scores may change over time, and the alert scores illustrated in graphical user interface 300 may be determined by dynamic record identification and analysis computing platform 110 for the current date and/or time (e.g., at step 211) and presented by analyst computer system 170 at such time and/or shortly thereafter, for instance, to assist an analyst using analyst computer system 170 in understanding the current risk levels of specific user accounts included in the alert table.

Referring again to FIG. 2D, at step 215, dynamic record identification and analysis computing platform 110 may receive one or more event feeds. For example, at step 215, dynamic record identification and analysis computing platform 110 may receive, via the communication interface (e.g., communication interface 116), one or more event feeds comprising event data identifying one or more events associated with the one or more user accounts. Such event feeds may, for instance, be received from one or more other systems (e.g., account management computer system 160) and/or from one or more internal monitoring components of dynamic record identification and analysis computing platform 110.

At step 216, dynamic record identification and analysis computing platform 110 may evaluate one or more events identified in and/or otherwise associated with the one or more event feeds. For example, at step 216, based on receiving the one or more event feeds comprising the event data identifying the one or more events associated with the one or more user accounts, dynamic record identification and analysis computing platform 110 may evaluate the one or more events associated with the one or more user accounts based on one or more temporally dynamic alert scores corresponding to the one or more user accounts. For instance, in evaluating the one or more events associated with the one or more user accounts, dynamic record identification and analysis computing platform 110 may apply one or more rules (which may, e.g., indicate whether dynamic record identification and analysis computing platform 110 should generate one or more alerts in particular circumstances, such as when a particular event occurs when a daily alert score is at or above a particular threshold amount) to the one or more events associated with the one or more user accounts based on the alert scores corresponding to such accounts.

Figure 2E:
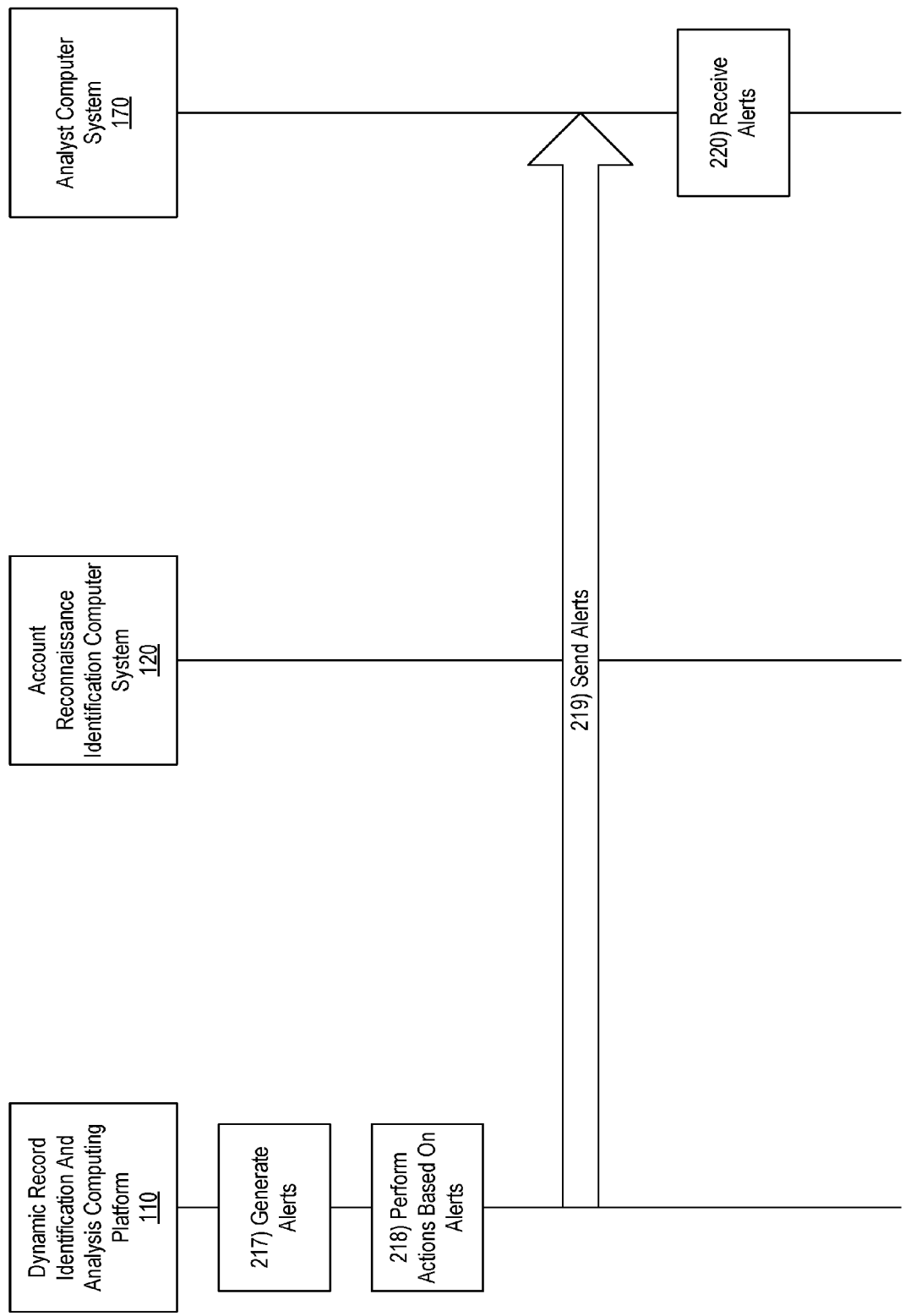

Referring to FIG. 2E, at step 217, dynamic record identification and analysis computing platform 110 may generate one or more alerts. For example, at step 217, based on evaluating the one or more events associated with the one or more user accounts, dynamic record identification and analysis computing platform 110 may generate at least one alert for at least one user account, and the at least one alert may identify at least one suspicious event associated with the at least one user account. In generating a particular alert for a particular user account, dynamic record identification and analysis computing platform 110 may determine that a particular event (which may, e.g., have occurred in connection with a specific user account) qualifies as a suspicious event based on the event occurring while a daily alert score for the specific user account was at or exceeded a predetermined threshold amount for such an event and/or type of an event.

At step 218, dynamic record identification and analysis computing platform 110 may perform one or more actions based on the one or more alerts. For example, at step 218, based on generating the at least one alert for the at least one user account, dynamic record identification and analysis computing platform 110 may perform one or more actions on the at least one user account, and the one or more actions performed on the at least one user account may be responsive to the at least one suspicious event associated with the at least one user account. For instance, in performing one or more actions on the at least one user account, dynamic record identification and analysis computing platform 110 may decline and/or cancel one or more monetary transactions associated with a specific user account based on the current alert score for the user account exceeding a predetermined threshold for monetary transactions and/or the particular type of monetary transaction (which may, e.g., be a transfer transaction, wire transaction, new account transaction, home equity line of credit transaction, credit card transaction, debit card transaction, check transaction, an EBT/ACH/PPR transaction, and/or the like) that occurred. Additionally or alternatively, in performing one or more actions on the at least one user account, dynamic record identification and analysis computing platform 110 may decline and/or cancel one or more non-monetary transactions associated with a specific user account based on the current alert score for the user account exceeding a predetermined threshold for non-monetary transactions and/or the particular type of non-monetary transaction (e.g., an address change transaction, a password reset transaction, and/or the like) that occurred. In some instances, different thresholds may be used for different types of monetary transactions and/or non-monetary transactions by dynamic record identification and analysis computing platform 110 when performing one or more actions on the at least one user account. For instance, dynamic record identification and analysis computing platform 110 may allow a home equity line of credit transaction to proceed when a daily alert score is less than or equal to 900 and may prevent such a home equity line of credit transaction from being completed when a daily alert score is above 900, but dynamic record identification and analysis computing platform 110 may use a different threshold for wire transactions. For instance, dynamic record identification and analysis computing platform 110 may allow a wire transaction to proceed when a daily alert score is less than or equal to but may prevent such a wire transaction from being completed when a daily alert score is above 500. Additionally or alternatively, dynamic record identification and analysis computing platform 110 may, in some instances, use a fixed threshold when evaluating and/or performing actions with respect to monetary transactions and/or non-monetary transactions.

At step 219, dynamic record identification and analysis computing platform 110 may send the one or more alerts to analyst computer system 170. For example, at step 219, based on generating the at least one alert for the at least one user account, dynamic record identification and analysis computing platform 110 may send, via the communication interface (e.g., communication interface 116), to the analyst computer system (e.g., analyst computer system 170), event alert information identifying the at least one alert generated for the at least one user account. Such event alert information may identify the alerts generated by dynamic record identification and analysis computing platform 110 to allow for further review and/or analysis of the alerts by an analyst using analyst computer system 170. At step 220, analyst computer system 170 may receive the one or more alerts from dynamic record identification and analysis computing platform 110.

Figure 4:
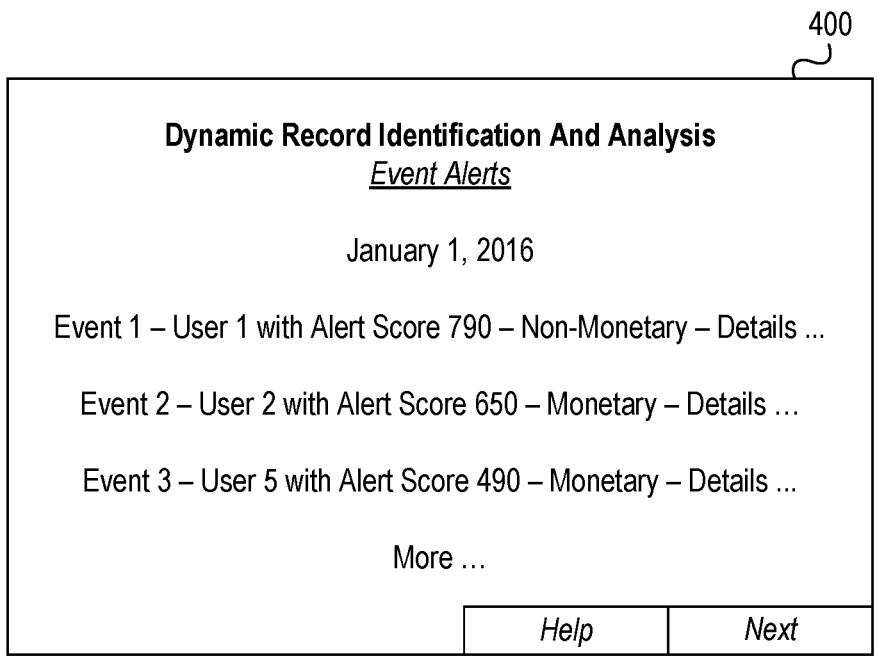

Referring to FIG. 2F, at step 221, analyst computer system 170 may present the one or more alerts (e.g., based on the one or more alerts received from dynamic record identification and analysis computing platform 110). In presenting the one or more alerts, analyst computer system 170 may display and/or otherwise present a graphical user interface similar to graphical user interface 400, which is illustrated in FIG. 4. As seen in FIG. 4, graphical user interface 400 may include information listing the current alerts that have been generated for one or more specific user accounts (which may, e.g., have been previously added to an alert table for heightened scrutiny and/or additional monitoring by dynamic record identification and analysis computing platform 110 and in which one or more events have occurred for which dynamic record identification and analysis computing platform 110 has generated one or more alerts). The listing information included in the graphical user interface may, for instance, identify the particular event and/or type of event that has occurred, the particular user account in which the event has occurred, the current alert score of the user account, the nature of the event (e.g., monetary transaction, non-monetary transaction, and/or the like), and/or additional information. Such information may, for instance, be presented by analyst computer system 170 to assist an analyst using analyst computer system 170 in understanding specific events, including potentially high risk events, which have occurred in specific user accounts.

Figure 5:
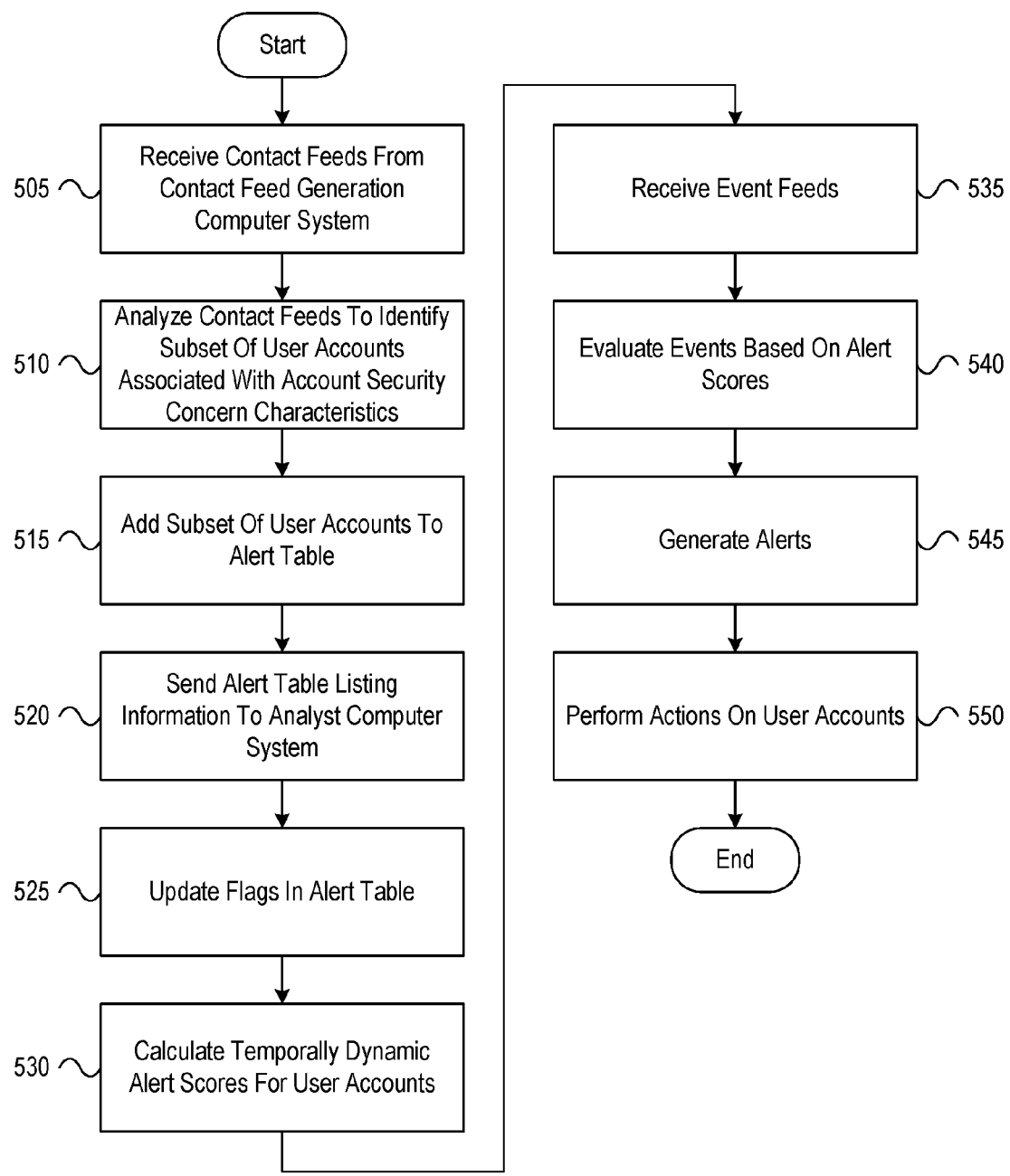
FIG. 5 depicts an illustrative method for deploying and utilizing a dynamic record identification and analysis computer system with event monitoring components in accordance with one or more example embodiments.

FIG. 5 depicts an illustrative method for deploying and utilizing a dynamic record identification and analysis computer system with event monitoring components in accordance with one or more example embodiments. Referring to FIG. 5, at step 505, a computing platform having at least one processor, a communication interface, and a memory may receive, via the communication interface, and from a contact feed generation computer system, one or more contact feeds comprising contact data identifying one or more contacts associated with one or more user accounts. At step 510, based on receiving the one or more contact feeds comprising the contact data identifying the one or more contacts associated with the one or more user accounts from the contact feed generation computer system, the computing platform may analyze the one or more contact feeds to identify a first subset of user accounts of the one or more user accounts, the first subset of user accounts having one or more attributes associated with one or more predetermined account security concern characteristics. At step 515, based on identifying the first subset of user accounts of the one or more user accounts, the computing platform may add the first subset of user accounts of the one or more user accounts to an alert table maintained by the computing platform. At step 520, based on adding the first subset of user accounts of the one or more user accounts to the alert table maintained by the computing platform, the computing platform may send, via the communication interface, to an analyst computer system, alert table listing information identifying contents of the alert table maintained by the computing platform.

At step 525, based on adding the first subset of user accounts of the one or more user accounts to the alert table maintained by the computing platform, the computing platform may update one or more flags in the alert table maintained by the computing platform, the one or more flags identifying one or more reasons for adding the first subset of user accounts of the one or more user accounts to the alert table maintained by the computing platform. At step 530, based on adding the first subset of user accounts of the one or more user accounts to the alert table maintained by the computing platform, the computing platform may calculate a temporally dynamic alert score for each user account of the first subset of user accounts added to the alert table.

At step 535, the computing platform may receive, via the communication interface, one or more event feeds comprising event data identifying one or more events associated with the one or more user accounts. At step 540, based on receiving the one or more event feeds comprising the event data identifying the one or more events associated with the one or more user accounts, the computing platform may evaluate the one or more events associated with the one or more user accounts based on one or more temporally dynamic alert scores corresponding to the one or more user accounts. At step 545, based on evaluating the one or more events associated with the one or more user accounts, the computing platform may generate at least one alert for at least one user account, the at least one alert identifying at least one suspicious event associated with the at least one user account. At step 550, based on generating the at least one alert for the at least one user account, the computing platform may perform one or more actions on the at least one user account, the one or more actions performed on the at least one user account being responsive to the at least one suspicious event associated with the at least one user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive, via the communication interface, and from a contact feed generation computer system, one or more contact feeds comprising contact data identifying one or more contacts associated with one or more user accounts;

based on receiving the one or more contact feeds comprising the contact data identifying the one or more contacts associated with the one or more user accounts from the contact feed generation computer system, analyze the one or more contact feeds to identify a first subset of user accounts of the one or more user accounts, the first subset of user accounts having one or more attributes associated with one or more predetermined account security concern characteristics;

based on identifying the first subset of user accounts of the one or more user accounts, add the first subset of user accounts of the one or more user accounts to an alert table maintained by the computing platform; and based on adding the first subset of user accounts of the one or more user accounts to the alert table maintained by the computing platform, send, via the communication interface, to an analyst computer system, alert table listing information identifying contents of the alert table maintained by the computing platform, wherein sending the alert table listing information identifying the contents of the alert table maintained by the computing platform to the analyst computer system causes the analyst computer system to display a graphical user interface based on the alert table listing information, wherein the memory stores additional computer-readable instructions that, when executed by the at least one processor, cause the computing platform to:

prior to receiving the one or more contact feeds comprising the contact data identifying the one or more contacts associated with the one or more user accounts from the contact feed generation computer system:

receive, via the communication interface, and from an account reconnaissance identification system, blacklist data identifying one or more suspicious telephone numbers associated with one or more account reconnaissance activities; and based on receiving the blacklist data identifying the one or more suspicious telephone numbers associated with the one or more account reconnaissance activities, update one or more local blacklist tables to include the blacklist data identifying the one or more suspicious telephone numbers associated with the one or more account reconnaissance activities, and wherein the account reconnaissance identification system is configured to monitor and analyze call data received from one or more interactive voice response (IVR) systems and one or more call center systems to identify the one or more suspicious telephone numbers associated with the one or more account reconnaissance activities.

2. The computing platform of claim 1, wherein the memory stores additional computer-readable instructions that, when executed by the at least one processor, cause the computing platform to:

based on adding the first subset of user accounts of the one or more user accounts to the alert table maintained by the computing platform, update one or more flags in the alert table maintained by the computing platform, the one or more flags identifying one or more reasons for adding the first subset of user accounts of the one or more user accounts to the alert table maintained by the computing platform.

3. The computing platform of claim 1, wherein the memory stores additional computer-readable instructions that, when executed by the at least one processor, cause the computing platform to:

based on adding the first subset of user accounts of the one or more user accounts to the alert table maintained by the computing platform, calculate a temporally dynamic alert score for each user account of the first subset of user accounts added to the alert table.

4. The computing platform of claim 1, wherein the memory stores additional computer-readable instructions that, when executed by the at least one processor, cause the computing platform to:

receive, via the communication interface, one or more event feeds comprising event data identifying one or more events associated with the one or more user accounts;

based on receiving the one or more event feeds comprising the event data identifying the one or more events associated with the one or more user accounts, evaluate the one or more events associated with the one or more user accounts based on one or more temporally dynamic alert scores corresponding to the one or more user accounts;

based on evaluating the one or more events associated with the one or more user accounts, generate at least one alert for at least one user account, the at least one alert identifying at least one suspicious event associated with the at least one user account; and based on generating the at least one alert for the at least one user account, perform one or more actions on the at least one user account, the one or more actions performed on the at least one user account being responsive to the at least one suspicious event associated with the at least one user account.

5. The computing platform of claim 4, wherein the memory stores additional computer-readable instructions that, when executed by the at least one processor, cause the computing platform to:

based on generating the at least one alert for the at least one user account, send, via the communication interface, to the analyst computer system, event alert information identifying the at least one alert generated for the at least one user account.

6. The computing platform of claim 1, wherein the contact data comprises information indicating that a first user account associated with a first user was contacted by a first telephone number, and wherein the contact data comprises information indicating that a second user account associated with a second user was contacted by a second telephone number.

7. The computing platform of claim 1, wherein the contact data comprises information indicating that a first user account associated with a first user was contacted by a first mobile malware application.

8. The computing platform of claim 1, wherein the contact data comprises information indicating that a first user account associated with a first user was contacted by a first suspicious network address.

9. The computing platform of claim 1, wherein the contact data comprises information indicating that a first user account associated with a first user was contacted by a first suspicious cookie.

10. The computing platform of claim 1, wherein the contact data comprises information indicating that a first user account associated with a first user was contacted by a first suspicious email address.

11. The computing platform of claim 1, wherein the contact data comprises information indicating that a first user account associated with a first user was contacted by a first suspicious text chat session.

12. The computing platform of claim 1, wherein the first subset of user accounts have at least one attribute indicative of previous unauthorized activity.

13. The computing platform of claim 1, wherein the first subset of user accounts have at least one attribute indicative of at least one previous account takeover event.

14. A method comprising:
at a computing platform comprising at least one processor, memory, and a communication interface:
receiving, by the at least one processor, via the communication interface, and from a contact feed generation computer system, one or more contact feeds comprising contact data identifying one or more contacts associated with one or more user accounts;
based on receiving the one or more contact feeds comprising the contact data identifying the one or more contacts associated with the one or more user accounts from the contact feed generation computer system, analyzing, by the at least one processor, the one or more contact feeds to identify a first subset of user accounts of the one or more user accounts, the first subset of user accounts having one or more attributes associated with one or more predetermined account security concern characteristics;
based on identifying the first subset of user accounts of the one or more user accounts, adding, by the at least one processor, the first subset of user accounts of the one or more user accounts to an alert table maintained by the computing platform; and
based on adding the first subset of user accounts of the one or more user accounts to the alert table maintained by the computing platform, sending, by the at least one processor, via the communication interface, to an analyst computer system, alert table listing information identifying contents of the alert table maintained by the computing platform, wherein sending the alert table listing information identifying the contents of the alert table maintained by the computing platform to the analyst computer system causes the analyst computer system to display a graphical user interface based on the alert table listing information,
wherein the method further comprises:
prior to receiving the one or more contact feeds comprising the contact data identifying the one or more contacts associated with the one or more user accounts from the contact feed generation computer system:
receiving, by the at least one processor, via the communication interface, and from an account reconnaissance identification system, blacklist data identifying one or more suspicious telephone numbers associated with one or more account reconnaissance activities; and
based on receiving the blacklist data identifying the one or more suspicious telephone numbers associated with the one or more account reconnaissance activities, updating, by the at least one processor, one or more local blacklist tables to include the blacklist data identifying the one or more suspicious telephone numbers associated with the one or more account reconnaissance activities, and wherein the account reconnaissance identification system is configured to monitor and analyze call data received from one or more interactive voice response (IVR) systems and one or more call center systems to identify the one or more suspicious telephone numbers associated with the one or more account reconnaissance activities.

15. The method of claim 14, further comprising:
based on adding the first subset of user accounts of the one or more user accounts to the alert table maintained by the computing platform, updating, by the at least one processor, one or more flags in the alert table maintained by the computing platform, the one or more flags identifying one or more reasons for adding the first subset of user accounts of the one or more user accounts to the alert table maintained by the computing platform.

16. The method of claim 14, further comprising:
based on adding the first subset of user accounts of the one or more user accounts to the alert table maintained by the computing platform, calculating, by the at least one processor, a temporally dynamic alert score for each user account of the first subset of user accounts added to the alert table.

17. The method of claim 14, further comprising:
receiving, by the at least one processor, via the communication interface, one or more event feeds comprising event data identifying one or more events associated with the one or more user accounts;
based on receiving the one or more event feeds comprising the event data identifying the one or more events associated with the one or more user accounts, evaluating, by the at least one processor, the one or more events associated with the one or more user accounts based on one or more temporally dynamic alert scores corresponding to the one or more user accounts;
based on evaluating the one or more events associated with the one or more user accounts, generating, by the at least one processor, at least one alert for at least one user account, the at least one alert identifying at least one suspicious event associated with the at least one user account; and
based on generating the at least one alert for the at least one user account, performing, by the at least one processor, one or more actions on the at least one user account, the one or more actions performed on the at least one user account being responsive to the at least one suspicious event associated with the at least one user account.

18. One or more non-transitory computer-readable media storing instructions that, when executed by a computing platform comprising at least one processor, memory, and a communication interface, cause the computing platform to:
receive, via the communication interface, and from a contact feed generation computer system, one or more contact feeds comprising contact data identifying one or more contacts associated with one or more user accounts;
based on receiving the one or more contact feeds comprising the contact data identifying the one or more contacts associated with the one or more user accounts from the contact feed generation computer system, analyze the one or more contact feeds to identify a first subset of user accounts of the one or more user accounts, the first subset of user accounts having one or more attributes associated with one or more predetermined account security concern characteristics;

based on identifying the first subset of user accounts of the one or more user accounts, add the first subset of user accounts of the one or more user accounts to an alert table maintained by the computing platform; and based on adding the first subset of user accounts of the one or more user accounts to the alert table maintained by the computing platform, send, via the communication interface, to an analyst computer system, alert table listing information identifying contents of the alert table maintained by the computing platform, wherein sending the alert table listing information identifying the contents of the alert table maintained by the computing platform to the analyst computer system causes the analyst computer system to display a graphical user interface based on the alert table listing information, wherein the one or more non-transitory computer-readable media store additional instructions that, when executed by the computing platform, cause the computing platform to:

prior to receiving the one or more contact feeds comprising the contact data identifying the one or more contacts associated with the one or more user accounts from the contact feed generation computer system:

receive, via the communication interface, and from an account reconnaissance identification system, blacklist data identifying one or more suspicious telephone numbers associated with one or more account reconnaissance activities; and based on receiving the blacklist data identifying the one or more suspicious telephone numbers associated with the one or more account reconnaissance activities, update one or more local blacklist tables to include the blacklist data identifying the one or more suspicious telephone numbers associated with the one or more account reconnaissance activities, and wherein the account reconnaissance identification system is configured to monitor and analyze call data received from one or more interactive voice response (IVR) systems and one or more call center systems to identify the one or more suspicious telephone numbers associated with the one or more account reconnaissance activities.

\* \* \* \* \*